United States Patent
Meehan

(10) Patent No.: US 11,424,938 B1
(45) Date of Patent: Aug. 23, 2022

(54) CREDENTIALED MINERS FOR A BLOCKCHAIN

(71) Applicant: Fall GUy LLC, Seattle, WA (US)

(72) Inventor: Patrick Meehan, Seattle, WA (US)

(73) Assignee: FALL GUY LLC, Seattle, WA (US)

( * ) Notice: Subject to any disclaimer, the term of this patent is extended or adjusted under 35 U.S.C. 154(b) by 92 days.

(21) Appl. No.: 16/563,547

(22) Filed: Sep. 6, 2019

Related U.S. Application Data

(60) Provisional application No. 62/728,014, filed on Sep. 6, 2018.

(51) Int. Cl.
*H04L 29/06* (2006.01)
*H04L 9/32* (2006.01)

(52) U.S. Cl.
CPC .......... *H04L 9/3263* (2013.01); *H04L 9/3247* (2013.01); *H04L 2209/38* (2013.01); *H04L 2209/56* (2013.01)

(58) Field of Classification Search
CPC . H04L 9/3263; H04L 2209/56; H04L 9/0643; H04L 9/30; H04L 2209/38; H04L 9/0637; H04L 9/0618; H04L 9/3247; H04L 9/3239; G06F 21/62; G06F 21/6209; G06F 21/6218; G06F 21/6227; G06F 16/1824; G06F 21/44; G06F 21/629; G06F 16/2379; G06Q 20/06; G06Q 20/382; G06Q 20/401; G06Q 2220/00; G06Q 20/381; G06Q 40/04; G06Q 20/3825; G06Q 20/3827; G06K 9/00577; G06K 2009/00583

See application file for complete search history.

(56) References Cited

U.S. PATENT DOCUMENTS

| | | | |
|---|---|---|---|
| 2003/0163704 A1* | 8/2003 | Dick | H04L 63/12 713/178 |
| 2011/0087883 A1* | 4/2011 | Campagna | H04L 9/3265 713/156 |
| 2018/0198624 A1* | 7/2018 | Bisti | H04L 9/3239 |
| 2019/0124146 A1* | 4/2019 | Austin | H04L 9/3236 |
| 2019/0303541 A1* | 10/2019 | Reddy | H04L 9/0643 |
| 2020/0007314 A1* | 1/2020 | Vouk | H04L 9/0637 |
| 2020/0218815 A1* | 7/2020 | Haque | H04L 9/3247 |

* cited by examiner

*Primary Examiner* — Malcolm Cribbs
(74) *Attorney, Agent, or Firm* — Alleman Hall Creasman & Tuttle LLP

(57) ABSTRACT

A system for credentialing a miner for a blockchain system is provided. The system interacts with a Trusted Witness to obtain a witness statement attesting to the identity of the miner. The witness statement includes a miner public key of the miner and a signed miner public key signed using the corresponding miner private key. The system provides to a notary the witness statement and signed bylaws signed using the miner public key. The system receives from the notary a digital identity signed by the notary that includes an identification of the notary, the witness statement, and the signed bylaws. The miner uses the digital identity when participating in mining for the blockchain system.

2 Claims, 3 Drawing Sheets

CREDENTIALED MINERS FOR A BLOCKCHAIN

CROSS-REFERENCE TO RELATED APPLICATION

This application claims the benefit of U.S. Provisional Application No. 62/728,014, filed on Sep. 6, 2018, titled CREDENTIALED MINERS FOR A BLOCKCHAIN, which is hereby incorporated by reference in its entirety.

BACKGROUND

The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key to transfer ownership to the new owner as represented by the new owner public key. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions fora bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created. A bitcoin ledger is sometimes referred to as an Unspent Transaction Output ("UXTO") set because it tracks the output of all transactions that have not yet been spent.

Although the bitcoin system has been very successful, it is limited to transactions in bitcoins or other cryptocurrencies. Efforts are currently underway to use blockchains to support transactions of any type, such as those relating to the sale of vehicles, sale of financial derivatives, sale of stock, payments on contracts, and so on. Such transactions use identity tokens, which are also referred to as digital bearer bonds, to uniquely identify something that can be owned or can own other things. An identity token for a physical or digital asset is generated using a cryptographic one-way hash of information that uniquely identifies the asset. Tokens also have an owner that uses an additional public/private key pair. The owner public key is set as the token owner identity and when performing actions against tokens, ownership proof is established by providing a signature generated by the owner private key and validated against the public key listed as the owner of the token. A person can be uniquely identified, for example, using a combination of a user name, social security number, and biometric (e.g., fingerprint). A product (e.g., refrigerator) can be uniquely identified, for example, using the name of its manufacturer and its seral number. The identity tokens for each would be a cryptographic one-way hash of such combinations. The identity token for an entity (e.g., person or company) may be the public key of a public/private key pair, where the private key is held by the entity. Identity tokens can be used to identify people, institutions, commodities, contracts, computer code, equities, derivatives, bonds, insurance, loans, documents, and so on. Identity tokens can also be used to identify collections of assets. An identity token for a collection may be a cryptographic one-way hash of the digital tokens of the assets in the collection. The creation of an identity token for an asset in a blockchain establishes provenance of the asset, and the identity token can be used in transactions (e.g., buying, selling, insuring) of the asset stored in a blockchain, creating a full audit trail of the transactions.

To record a simple transaction in a blockchain, each party and asset involved with the transaction needs an account that is identified by a digital token. For example, when one person wants to transfer a car to another person, the current owner and next owner create accounts, and the current owner also creates an account that is uniquely identified by its vehicle identification number. The account for the car identifies the current owner. The current owner creates a transaction against the account for the car that indicates that the transaction is a transfer of ownership transfer, indicates the public keys (i.e., identity tokens) of the current owner and the next owner, and indicates the identity token of the car. The transaction is signed by the private key of the current owner and the transaction is evidence that the next owner is now the current owner.

To enable more complex transactions than bitcoin can support, some systems use "smart contracts." A smart contract is computer code that implements transactions of a contract. The computer code may be executed in a secure platform (e.g., an Ethereum platform, which provides a virtual machine) that supports recording transactions in blockchains. In addition, the smart contract itself is recorded as a transaction in the blockchain using an identity token that is a hash (i.e., identity token) of the computer code so that the computer code that is executed can be authenticated. When deployed, a constructor of the smart contract executes, initializing the smart contract and its state. The state of a smart contract is stored persistently in the blockchain. When a transaction is recorded against a smart contract, a message is sent to the smart contract, and the computer code of the smart contract executes to implement the transaction (e.g., debit a certain amount from the balance of an account). The computer code ensures that all the terms of the contract are complied with before the transaction is recorded in the blockchain. For example, a smart contract may support the sale of an asset. The inputs to a smart contract to sell a car may be the identity tokens of the seller, the buyer, and the car and the sale price in U.S. dollars. The computer code ensures that the seller is the current owner of the car and that the buyer has sufficient funds in their account. The computer code then records a transaction that transfers the ownership of the car to the buyer and a transaction that transfers the sale price from the buyer's account to the seller's account. If the seller's account is in U.S. dollars and the buyer's account is Canadian dollars, the computer code may retrieve a currency exchange rate, determine how many Canadian dollars the seller's account should be debited, and record the exchange rate. If either transaction is not successful, neither transaction is recorded.

Distributed ledger technologies in general, and blockchains in particular, promise to lower transaction costs between entities by commoditizing the processing of those transactions.

Instead of transactions being processed by a handful of trusted third parties, who can corner the market, drive prices up and censor transactions, transactions are processed by a network of providers, all of which offer an equivalent service and may be operated in a low to no-trust environment. The transaction processors may be arbitrary third parties, or may be the participants in the transactions themselves.

Blockchain and distributed ledger protocols such as Bitcoin, Ethereum, Hyperledger, Ripple and many others attempt to fulfill this promise. The design of these systems, however, either leaves them open to attack by unscrupulous transactions processors or obviates their open nature, thus limiting their utility.

Terminology

Distributed Ledger: A database maintained simultaneously by a number of participants.
Blockchain: A data structure for maintaining a distributed ledger.
Miners: A network of participants working in parallel to maintain a distributed ledger.
Protocol: The common rules for extending a distributed ledger, followed by miners.
Consensus Algorithm: An algorithm used by a protocol to unambiguously determine a universal order for all entries in a ledger.
Byzantine Fault Tolerance: A characteristic of consensus algorithms that can continue to operate even when as some participants in a mining network deliberately (or in error) communicate unreliably.
Cryptographic Contest: An algorithm for selecting the next miner to extend the ledger; may be part of a Consensus Algorithm.
Work: A cryptographic contest in which the likelihood of winning increases with the amount of computation performed and (typically) participants performing an equal amount of computation will have an equal chance of winning.

Note: "Miners" typically means participants in a blockchain protocol using cryptographic work in its consensus algorithm. In this document, we use "miner" and "mining" more loosely, to mean any participant in a network maintaining any kind of distributed ledger with any kind of consensus algorithm, even if no cryptographic work is performed.

Problem: Sybil Attacks

Consensus algorithms that implement Byzantine fault tolerance through cryptographic contests and subject to Sybil attack. A Sybil attack occurs when a single entity enters a cryptographic contest multiple times to gain an unfair advantage. If successful, a Sybil attack will allow the attacker to gain control of the ledger, create double spends and defraud users of the ledger.

Attacking Proof of Work Protocols

"Permissionless" distributed ledger protocols such as Bitcoin and Ethereum attempt to prevent Sybil attacks by making them expensive to do. This is accomplished by using work as a cryptographic contest. The difficulty of the work is scaled progressively, so miners must constantly compete to increase their computational power.

While clever, this solution does nothing to prevent a nefarious entity from obtaining more than 50% of the mining network's computation power, and thus gaining control of the ledger. Furthermore, the demand for computation encourages consolidation: participants are strongly incentivised to pool their computation power together increase their odds of winning. As consolidation continues, the ability of a single entity (or small group of entities) to attack the ledger increases. Finally, the cost of cryptographic work is enormously wasteful, to the point of posing an environmental threat through its energy consumption.

Attacking Proof of Stake Protocols

"Proof of Stake" attempts to replace work (i.e. computational power) with some other resource. Typically, this resource is the native cryptocurrency of the protocol itself. If that seems a bit circular, it is. An entity or a group of entities could easily conspire to secretly obtain enough of a protocol's cryptocurrency to attack it. To date, no proof of stake algorithm has been conclusively shown to be secure, in spite of years of research and theorizing.

Problem: No Recourse

Anonymous miners who attack a protocol have no direct accountability to users of the network and thus no liability. Even if a miner can be identified, they made no promise of fitness or integrity to users of the network. Miners also have plausible deniability: they can claim their software was compromised without their knowledge.

In other words, without the aid of criminal law, users of a permissionless distributed ledger may have little to no recourse against miners who deliberately attack and defraud them.

Non-Solution: Private Protocols

An easy way to deal with these problems is to not solve them. If we don't care about allowing arbitrary participants to become miners we can use simpler consensus algorithms that do not assume malicious participants.

In a private protocol, miners are not anonymous and membership is controlled by a single authority or a coalition. "Federated" or "coalition" protocols are subtypes of private protocols.

As miners are known and can be strongly identified, Sybil attacks are not possible. Miners can also be held legally accountable for their actions, thus accepting liability and providing recourse to users of the protocol.

Private protocols are most useful in closed ecosystems (such as banking or supply chain logistics) where a coalition of industry participants wish to eliminate their reliance on some third party whose only function is to process transactions. In this case, a coalition maybe formed among these participants to run a private protocol "at cost," thus eliminating transaction fees.

While private protocols are immune to Sybil attacks and can provide legal recourse, they are less optimal for offering open transaction processing services to the general public in that the coalition controlling them can still price fix and censor transactions. Thus, they are not suitable for robustly modeling ownership and exchange of assets, cryptographic or otherwise: users of a private protocol have no guarantee that the protocol will continue to be operated, or will be operated fairly.

Partial Solution: Locally Chosen Validators

Another approach to the problem of Sybil attacks and lack of recourse is to allow users of the protocol to self-select a pool of "validators" to sanction transactions. Each participant in a transaction brings their own pool of validators to witness the transaction. If these validators are malicious, they can only conspire to affect the specific users who selected them.

While in theory this approach provides recourse, the burden of preventing a Sybil attack is shifted to the end user. They must be aware of the potential for attack and find some reliable way to identify attackers, who may be sophisticated (and may even be legitimate business concerns operating legally).

In addition, there is no "right to participate" in the mining network of this kind of protocol, and thus there is little incentive for the pool of trusted validators to grow. Once a sufficiently large pool of validators is established, it is hard to imagine how new validators could participate. Thus, the free market promise is limited.

SUMMARY

DETAILED DESCRIPTION

Figure 1:
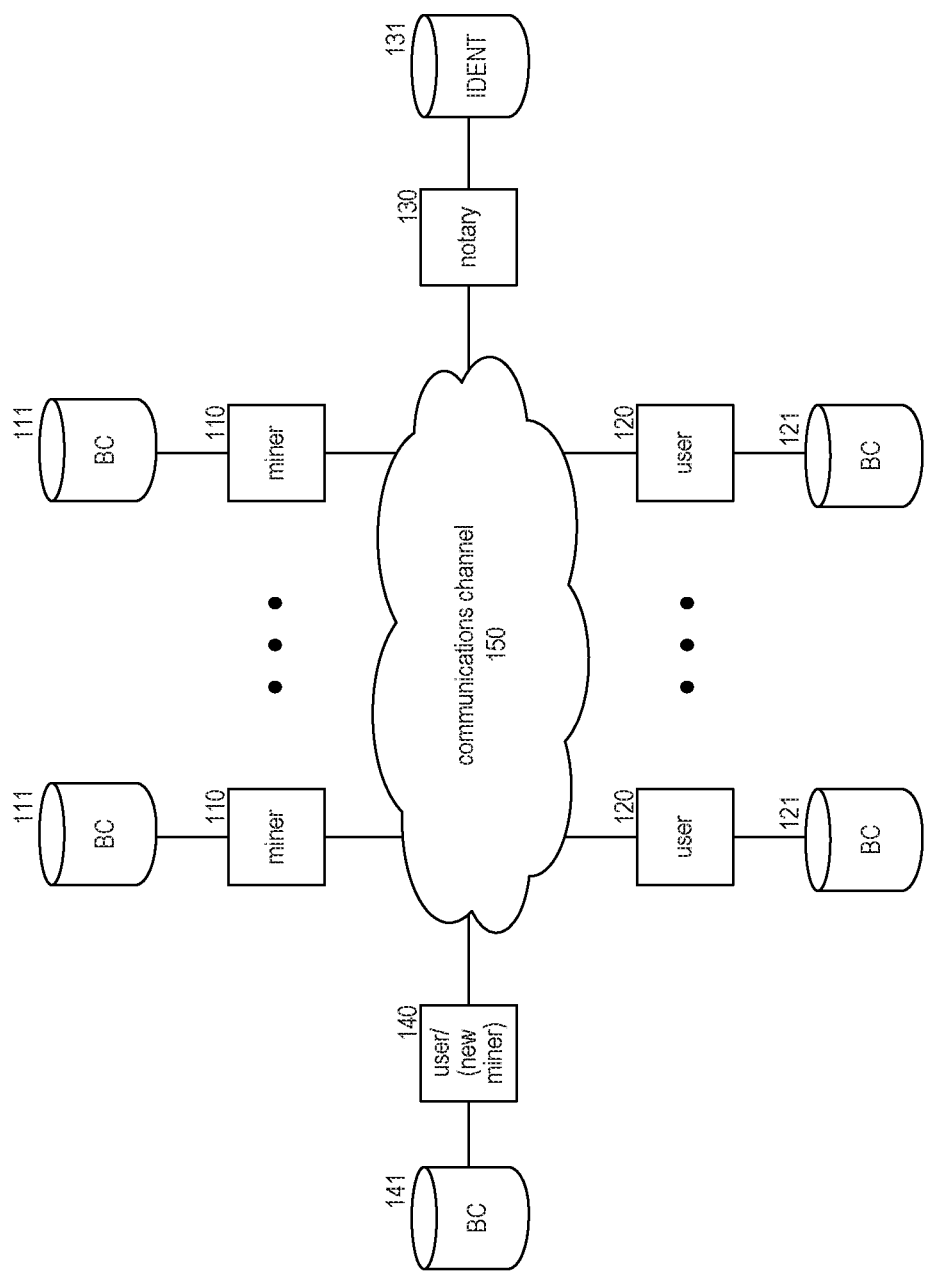
FIG. 1 is a block diagram that illustrates nodes of the CPP system in some embodiments.

A Credentialed Public Protocol ("CPP") system provides a solution that incorporates attributes of both permissionless and permissioned protocols, but is distinct from both. It is controlled by no private or governing entity or coalition, yet provides legal recourse to all participants.

The CPP system leverages strong digital identity to create a "credentialed" public protocol in which any legally distinct person or entity may participate as a miner under a standardized set of terms. In some cases, anonymity of individual mining participants may be preserved, for example if the entity is a corporation registered in a State that permits anonymity of its officers and shareholders.

The "bylaws" of the protocol set forth the terms for becoming a verified miner such that mining must be conducted transparently, under the rule of law, and, in some implementations, with additional protection for participants, such as the requirement for miners to carry liability insurance to guarantee the value of transactions.

The CPP system is a digital "mining identity" generated or recorded by an impartial Trusted Witness. Miners without a valid identity will be ignored by the protocol.

The mining identity contains verifiable identifying information, one or more public keys and, optionally, additional text, operating provisions and requirements to participate in the protocol, digitally signed by the identity holder's private key. The identity must be recorded by a system of a Trusted Witness.

A Trusted Witness can be any entity capable of holding legal responsibility for identifying individuals and of meeting various jurisdictional requirements for witnessing the execution of legally binding contracts. For example, notaries, corporations and government agencies may be act as Trusted Witnesses (depending on the governing law specified in a protocol's bylaws), whether or not they are aware of or participate directly in the protocol.

The CPP system provides an automated way to verify the statement of the Trusted Witness. In some embodiments, the Trusted Witness will have one or more known public keys, in which case the digital signature of the Trusted Witness may be enough. Alternatively, other existing infrastructure may be used, even without participation from the Trusted Witness. For example, if a state or country requires strong identification to form a corporation, and a database of corporations and their articles of incorporation is available online, the digital mining identity may be incorporated into those articles to later be retrieved automatically and scanned by a protocol to verify their content, even without the Trusted Witness using a private key or creating a digital signature.

Multiple Trusted Witnesses may be incorporated into a protocol. Some protocols may allow Trusted Witnesses to verify new Trusted Witnesses, and some protocols may require the participation of multiple independent Trusted Witnesses to verify new miners or Witnesses.

In jurisdictions where digital identities may be used to enter into legally binding agreements, the role of Trusted Witness may be fulfilled by a Certificate Authority. The Certificate Authority verifies the miner's identity and issues a digital certificate, then the miner uses the private key corresponding to the public key in their certificate to sign and accept the bylaws of the protocol.

The CPP system has advantages over permissionless protocols such as miners are strongly identified and can be held legally accountable for protecting users of the network.

The CPP system has advantages over private/permissioned protocols in that the protocol (and permission) is not controlled by a single entity or a coalition of entities. The CPP system has advantages over "chosen validator" protocols in that protocol users are not required to choose miners. The CPP system allows any legal entity meeting some general legal criteria (such as verifiable citizenship, carrying insurance, or being a corporation) to have a right to join the mining network and perpetuate the protocol, even without getting permission of any other participant in or user of the protocol.

Examples

The examples illustrate processing performed by processes executing on various nodes (e.g., mining nodes, and notary nodes) of the CPP system.

1. User U wishes to participate in the mining network.
   a. U is in a jurisdiction where digital identities may be used to enter into legally binding agreements.

b. The mining network recognizes these jurisdictions and specifies requirements for digital identities.
2. U generates a public/private key pair, Kpub/Kpriv.
3. U prepares a Certificate Signing Request (CSR) including Kpub.
4. U sends the CSR to a Certificate Authority (CA) along with identifying information.
5. CA identities U to whatever standard is required (by the protocol and by law), and issues digital identity IDENT (Kpub) in the form of a digital certificate.
6. U uses Kpriv to sign the protocol's bylaws, producing SIG(Kpriv, LAWS).

In the example above, the function of CA may be replaced by an e-citizenship, such as that offered by the government of Estonia.

In jurisdictions where witnessing/notarization is required, prospective miners will follow whatever procedure is set form by law to produce whatever artifacts are required to prove notarization, to the extent such artifacts are recognized by the protocol. For example, the above flow may be expanded to include the additional signing of SIG(Kpriv, LAWS) by a notary N, and the subsequent verification of N's identity by the protocol.

Once IDENT(Kpub) and SIG(Kpriv, LAWS) are created, U presents them to the mining network. Before being allowed to participate, the network must verify that U is in good standing:

1. U creates a mining account MU and submits MU to the mining network in a transaction T(MU,IDENT (Kpub), SIG(Kpriv, LAWS)), hereafter "NEW_MINER(MU)."
2. Miner MX wins the right to create a ledger entry, BN, and wishes to incorporate NEW_MINER(MU) into BN.
3. Miner MX verifies IDENT(Kpub).
    a. MX can verify the signature of CA:
        i. The identity of CA and CA's public key is known ahead of time.
        ii. OR a trusted service is relied upon to identify CA.
    b. IDENT(Kpub) will be rejected if CA cannot be identified, is not in good standing, or if a mining account incorporating the ID portion of DENT already exists.
4. Miner MX verifies SIG(Kpriv, LAWS) using Kpub.
    a. IDENT(Kpub) proves the identity of Kpub.
    b. SIG(Kpriv, LAWS) proves that the owner of Kpub has accepted LAWS.
5. Miner MX includes NEW_MINER(MU) into BN, publishes BN, and it is incorporated into the ledger.
6. Each subsequent miner also verifies IDENT(Kpub) before accepting BN and preparing new ledger entries based on it.
7. After a majority of participating miners have extended the ledger beyond BN, IDENT(Kpub) no longer needs to be verified; it is known that the majority of miners have independently verified, and thus MU is considered to be a verified account in good standing.
8. MU may now participate in the mining network; MU's entries in the contest to win the right to create a ledger entry will be recognized by the network.

The CPP system does not require work or any other wasteful contest to reach consensus. It may be desirable to randomize the order of miners as they extend the ledger in a way that is unpredictable but maximizes diversity (and thus trustworthiness) of miner contributions.

The CPP system may support the following contest:
1. For each block BN, an "allure" ALLURE(M,N) is computed by each participating miner M.
    a. ALLURE(M,N) is deterministic but unique to each miner.
    b. ALLURE(M,N) cannot be predicted by any miner other than M, but once computed by M and revealed, may be proven to be correct.
    c. ALLURE(M,N) may be specified as a signature produced by a private key held by M.
    d. ALLURE(M,N) may be specified as M's signature of the block count N, in which case, ALLURE(M,N) may be precomputed by any M.
    e. ALLURE(M,N) may be specified to include the allure of any previous block (in which case it will be impractical to precompute, as the private key of every other miner must be known).
2. Each miner incorporates ALLURE(M,N) into a proposed BN and submits BN to the network.
3. For a block at position N, given multiple candidates for BN, the "most alluring" BN is chosen.
    a. The criteria for "most alluring" may be specified as any ordering of ALLURE(M,N), for example lexicographical order, provided that criteria is applied consistently.
4. A writeback time span may be specified which will limit rewriting of the chain in the case of late submissions of an otherwise winning BN.
    a. Each BN is timestamped.
    b. Any length of chain may be determined to be more, less or equally alluring as any other equal length of chain.
    c. A BN submitted late (with an earlier timestamp than the current top block or blocks) will create a fork.
    d. A fork will only become the primary chain once a more alluring chain of sufficient length to fill in the elapsed time has been presented.

Here is another:
1. The ledger is extended in cycles.
2. Each cycle is made up of blocks.
3. Each block is mined by a single miner.
4. A "cycle" is established as soon as a block from a previously participating miner is successfully committed into the ledger.
    a. For miners A, B, C, D an example of a chain of three cycles might be [A, C, B, D][B, D, A, C][C, B, D, A].
    b. The protocol may recognize scenarios where one or more miners are unable to participate in all cycles, for example [A, C, B, D][B, A, C][C, B, D][B, A, C, D].
5. Miners participate in each cycle in a deterministic but unpredictable order.
    a. There is a "strong ordering" in each cycle.
    b. The order changes each cycle.
    c. Miners do not know where they are in the order until they are in the cycle and know the position of most or all other miners.
6. A new cycle begins as soon as a miner is repeated.
    a. Cycles may be of different lengths, if some miners are absent.
7. Every cycle a new "beacon" is chosen.
    a. The "beacon" may simply be the cycle number, an integer that increases every cycle.
    b. Optionally, the beacon may incorporate entropy from previous cycles, such as the number of blocks in a previous cycle, or the hash (or hashes) of particular (or all) blocks.

8. To participate in a cycle, each miner uses the beacon and their private key to compute an "allure."
   a. The allure is digital signature produced by the miner's private key.
   b. The allure can be verified by anyone who knows the miner's public key.
      i. Thus, the allure is tied to the miner and cannot be faked or altered.
   c. For any given block in a cycle N, the allure will be incorporated into the block and signed; thus the allure is inseparable from the block.
      i. Each block "has" an allure.
9. The order of miners in the cycle is determined by the lexicographic sort of their allures.
   a. Should the beacon used to calculate the allure incorporate entropy from previous cycles, then the ordering of blocks in later cycles may change as previous cycles are revised. Thus, in this variant, the final ordering of a cycle will not be known until the ordering of all previous cycles has been determined.
10. Cycles may be rewritten as new block with higher allure are published (because a block's allure cannot be known ahead of time, and can only be computed by the miner it belongs to, though is verifiable by anyone).
    a. The contents and order of a cycle will continue to "churn" until all active participants have presented (and revised) their entries.
11. Miners present their version of the chain to each other.
    a. Any two versions of the chain may be compared and, if different, one will always be preferred.
    b. The preference criterion is deterministic and applies across the whole network; every miner following the protocol will make the same decision if presented the same variations.
    c. For example, a chain fragment with longer cycles (in which blocks are lexicographically sorted by allure) would be preferred over a shorter cycle.
       i. If all miners are participating, this will have the effect of always preferring chains with cycles in which every miner participates.
       ii. Rules must be introduced to prevent miners who cannot participate from modifying earlier cycles; see below.
12. Once a miner proposes a block for cycle N, the miner will immediately "lead" the next cycle (N+1) by proposing the first block of N+1, which will stand until another miner either extends N or proposes a more alluring start to N+1.
    a. In some cases, a miner's block may be positioned at the end of cycle N (because it has the lowest allure in cycle N), but may successfully lead cycle N+1 with a new block (because it has the highest allure in N+1).
       i. This can only be known once all miner's blocks for N+1 have been considered.
13. As the chain extends and more cycles are added, rules prevent earlier cycles from being modified, except in certain cases.
    a. Modifying a cycle truncates the chain to the point of modification.
    b. Modification happens when a shorter version of the chain is preferred to a longer version (due to a preferable allure-based order or more entries per cycle).
    c. The most recent cycle may always be modified; any new miner is guaranteed a place in the most recent cycle.
    d. For each cycle, miners keep track of other miners who are recorded in the cycle's portion of the ledger, as well as the superset of miners who are participating in the cycle, but may not be recorded (for example, if they submitted a block before another miner submitted a more alluring block, causing their block to be erased).
    e. Once a miner knows that a certain percentage of all known miners have participated in a cycle, that miner will reject blocks proposed for earlier cycles, no matter how alluring.
       i. For example, if cycle N is the most recent cycle and cycle N−1 is the previous cycle, miner M will continue to allow changes to N−1 until more than 50% of known miners have submitted a change to N.

In the consensus algorithm described above there exists a scenario where more than 50% of the miners stop participating. In this case, if these miners conspire to suddenly resume mining, they will be able to truncate and rewrite the chain.

The CPP system may employ various strategies to mitigate this conspiracy. For example, mining accounts can be frozen after they are dormant for a number of cycles. To resume participation, the CPP system may require those accounts will need to be reactivated by including a transaction in a current cycle.

As another example strategy, the CPP system may officially recognize such forks as part of the protocol. If a small cohort conspires to mine ahead of the main chain, in effect isolating the majority, they are essentially declaring their intent to permanently fork the chain. Similarly, if the majority of miners decides to resume mining from an earlier point, they too are deliberately forking the chain. In both cases, the CPP system may detect and not merge the forks.

FIG. 1 is a block diagram that illustrates nodes of the CPP system in some embodiments. The nodes of the CPP system include miner nodes 110 which maintain copies of the blockchain 111, a user node 140 of a user that proposes to become a miner which may maintain a copy of the blockchain 142, and one or more notary nodes 130 that maintains an identification database 131. User nodes 120, which may maintain copies of the blockchain 121, participate in the blockchain. The nodes interact via communications channel 150.

Figure 2:
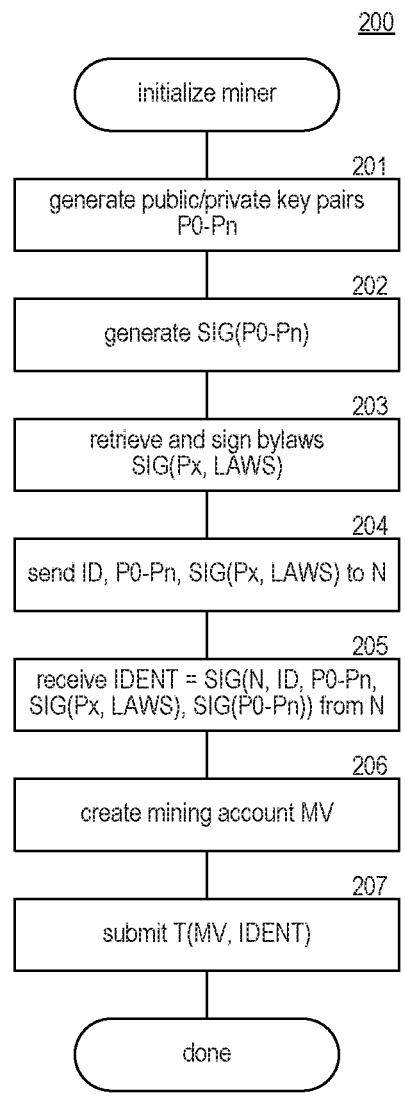
FIG. 2 is a flow diagram that illustrates processing of initialize miner component of user node in some embodiments.

FIG. 2 is a flow diagram that illustrates processing of initialize miner component of user node 140 in some embodiments. The initialize miner component 200 is invoked by a user node to create a mining identity and propose a mining transaction. In block 201, the component generates public/private key pairs with the public keys identified as Px. In block 202, the component signs the public keys. In block 203, the component retrieves and signs the bylaws that govern the mining. In block 204, the component sends an identification of the user node, the public keys, and the signed bylaws to a notary. In block 205, the component receives a mining identity from the notary that includes an identifier of the notary, the identifier of the node, the public keys the signed bylaws, and the signature of the public keys. In block 206, the component creates a mining account. In block 207, the component submits a transaction that includes an identifier of the mining account and the mining identity and then completes.

Figure 3:
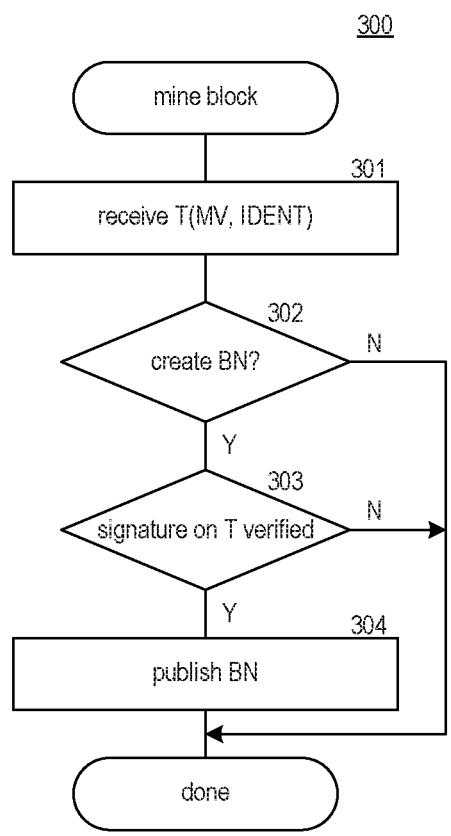
FIG. 3 is a flow diagram that illustrates the processing of a mine block component of a miner node in some embodiments.

FIG. 3 is a flow diagram that illustrates the processing of a mine block component of a miner node in some embodiments. The mine block component 300 is invoked to mine the next block of the blockchain. In block 301, the component receives a transaction that includes a mining identifier and an identifier of a mining account. In block decision 302, if the miner node is to create the next ledger entry, then the component continues at block 303, else the component completes. In decision block 303, if the signature on the transaction is verified, then the component continues at block 304, else the component completes. In block 304, the component publishes the ledger entry and then completes.

The computing systems (e.g., nodes) on which the CPP systems, the above described technologies, may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory, such as primary memory, cache memory, and secondary memory (e.g., DVD) and other storage. The computer-readable storage media may have recorded on it or may be encoded with computer-executable instructions or logic that implements the systems. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The systems may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the systems may be implemented in hardware using, for example, an application-specific integrated circuit (ASIC) or field programmable gate array ("FPGA").

I claim:

1. A non-transitory computer-readable medium storing instructions that, when executed by a computing system having at least one memory and at least one processor, cause the computing system to perform a method for credentialing a miner for participation in a blockchain system, the method comprising:
    interacting with a trusted witness to obtain a witness statement attesting to an identity of the miner, the witness statement including a miner public key and a signature of the trusted witness;
    using a private key corresponding to the miner public key to sign and accept bylaws of the blockchain system in front of a witness or a notary using a private key paired with a strongly identified public key to sign the signature of the miner accepting the bylaws; and
    verifying the witness statement and the miner's signature of the bylaws to qualify the miner for participation in the blockchain system.

2. A method for credentialing a miner for participation in a blockchain system, the method comprising:
    obtaining a witness statement attesting to an identity of the miner, the witness statement including a miner public key and a cryptographic signature of a trusted witness;
    obtaining a cryptographic signature of a miner produced from a private key corresponding to the miner public key cryptographically signing bylaws of the blockchain system;
    obtaining a cryptographic signature of a witness or a notary produced from a private key paired with a strongly identified public key of the witness or notary cryptographically signing the cryptographic signature of the miner; and
    verifying the witness statement and the miner's cryptographic signature of the bylaws to qualify the miner for participation in the blockchain system.

\* \* \* \* \*